US007096576B2

(12) United States Patent
Schmitt

(10) Patent No.: US 7,096,576 B2
(45) Date of Patent: Aug. 29, 2006

(54) PORTABLE TOOL FOR INSTALLING FIXING ELEMENTS

(75) Inventor: Geneviève Schmitt, Seclin (FR)

(73) Assignee: Advanced Automation, Seclin (FR)

( * ) Notice: Subject to any disclaimer, the term of this patent is extended or adjusted under 35 U.S.C. 154(b) by 114 days.

(21) Appl. No.: 10/480,086

(22) PCT Filed: Jun. 14, 2002

(86) PCT No.: PCT/FR02/02060

§ 371 (c)(1),
(2), (4) Date: Jun. 14, 2004

(87) PCT Pub. No.: WO02/102530

PCT Pub. Date: Dec. 27, 2002

(65) Prior Publication Data

US 2004/0205950 A1 Oct. 21, 2004

(30) Foreign Application Priority Data

Jun. 15, 2001 (FR) .................................. 01 07822
Jun. 14, 2002 (FR) .................................. 02 07322

(51) Int. Cl.
*B23P 19/00* (2006.01)
*B21J 15/00* (2006.01)
*B22J 15/10* (2006.01)

(52) U.S. Cl. ...................... 29/798; 29/524.1; 29/243.5; 29/243.53

(58) Field of Classification Search ............. 29/407.09, 29/407.1, 524.1, 525.05, 798, 243.53, 243.5, 29/243.54, 811.2, 818, 812.5; 227/27
See application file for complete search history.

(56) References Cited

U.S. PATENT DOCUMENTS 4,205,547 A * 6/1980 Yamasaka .................. 29/812.5
4,747,294 A * 5/1988 Schwartz et al. .......... 29/812.5
5,123,162 A * 6/1992 Wing et al. .................... 29/818
6,240,613 B1 * 6/2001 O'Connor et al. ....... 29/407.01
6,256,854 B1 * 7/2001 Chitty et al. ............. 29/243.53
6,347,449 B1 * 2/2002 Calkins et al. ................ 29/701

FOREIGN PATENT DOCUMENTS

DE 39 30 999 A 3/1991
DE 43 35 668 A 4/1995
EP 0 750 954 A 1/1997
EP 1 010 483 A 6/2000

* cited by examiner

*Primary Examiner*—Jermie E. Cozart
(74) *Attorney, Agent, or Firm*—Egbert Law Offices

(57) ABSTRACT

A portable tool used for installing fixing elements for assembling parts, which is particularly suitable for assembling machined parts or sheet metal by riveting. The portable tool includes a device for distributing fixing elements, one by one, according to a distribution axis; mechanism for holding a fixing element according to a placement axis; loading device for transferring a fixing element from the distribution device to the mechanism for holding; and a device for mounting a fixing element in a hole provided in the parts. The tool is characterized in that the loading device alternates between a loading movement for transferring a fixing element from the distribution device to the mechanism for holding and movement back to the initial position. During movements, the loading device describes the same path, alternating between one direction and the opposite direction.

12 Claims, 7 Drawing Sheets

PORTABLE TOOL FOR INSTALLING FIXING ELEMENTS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention relates to a portable tool, intended to be used for the installation of fastening elements, for the assembly of machined parts or of metal sheets. It is particularly suited, but not exclusively, for riveting.

This invention also relates to a set of tools comprising a portable tool for the installation of fastening elements and to a drilling tool.

BACKGROUND OF THE INVENTION

Riveting different parts together consists of inserting a fastening element in a pre-drilled hole in each of said parts and matched during the operation. Then in a later stage, the fastening element is locked either by deformation thereof or by adding a locking element such as a nut or a ductile ring. Matching the holes drilled in the different parts is advantageously realized when drilling the parts together, during the same operation.

There is a large number of riveting devices, enabling an operator to perform each of these operations in succession. However, these devices require the operator to choose and to position the fastening element manually.

This has first of all a major shortcoming, from the economic viewpoint of the workstation. Indeed, the operator has not at his workstation all the fastening elements which he may need to perform the riveting operations. Secondly, such devices involve high risks as regards the quality of the work since the operator may be mistaken and use an inappropriate fastening element.

There are also mechanized elements moved by controlled machines, to ensure the complete sequence of operations. Such devices integrate means for selecting and making available fastening elements, suited to the location where riveting is carried out, but which have the major shortcoming of being heavy and cumbersome. Consequently, they cannot provide a portable tool handled directly by an operator.

Since the document EP-0,750.954, an apparatus has been known for feeding, setting and loading a riveting gun.

However, such apparatus is only suited to rivets fitted with a holding rod, situated opposite the rivet body with respect to the head of the rivet.

Moreover, during the operation of this apparatus, and notably for bringing the loading arm back to the starting position, the rivet-carrier may slip over the rivet and thereby twist it.

The purpose of this invention is to provide a tool which remedies the shortcomings aforementioned. In particular, the aim will consist in providing an ergonomic tool, easy to be handled.

It will also consist in providing a tool which enables to improve the riveting quality while remaining simple of use and cheap.

Other purposes and advantages will appear during the following description, given only for informative purposes and without being limited thereto.

BRIEF SUMMARY OF THE INVENTION

The invention relates to a portable tool for the installation of fastening parts, of the type comprising:

means for distributing fastening elements, one by one, according to a so-called distribution axis, means for holding a fastening element according to a so-called setting axis, loading means for transferring a fastening element from said distribution means to said holding means, and means for positioning a fastening element in a hole provided on said parts.

This portable tool is characterized in that the loading means perform alternately a loading motion to transfer a fastening element from the distribution means to the holding means and a return motion to initial position, during which motions the loading means follow an alternate path in one direction and in the opposite direction.

According to a variation of the invention, the loading means comprise at least one mobile arm fitted with means for receiving a fastening element as well as means for actuating said mobile arm comprising at least one actuator and transmission means.

According to the invention, the mobile arm may be in the form of a telescopic pivoting arm or in the form of a sliding arm.

This invention also relates to a set of portable tools including a portable tool for the installation of fastening elements, and a drill, said tool and the drill being movable over half a turn around an axis perpendicular to the working axis, to position the drill and said tool in the working axis alternately.

BRIEF DESCRIPTION OF THE SEVERAL VIEWS OF THE DRAWINGS

The invention will be understood better when reading the description, accompanied by the appended drawings, wherein.

DETAILED DESCRIPTION OF THE INVENTION

Figure 1:
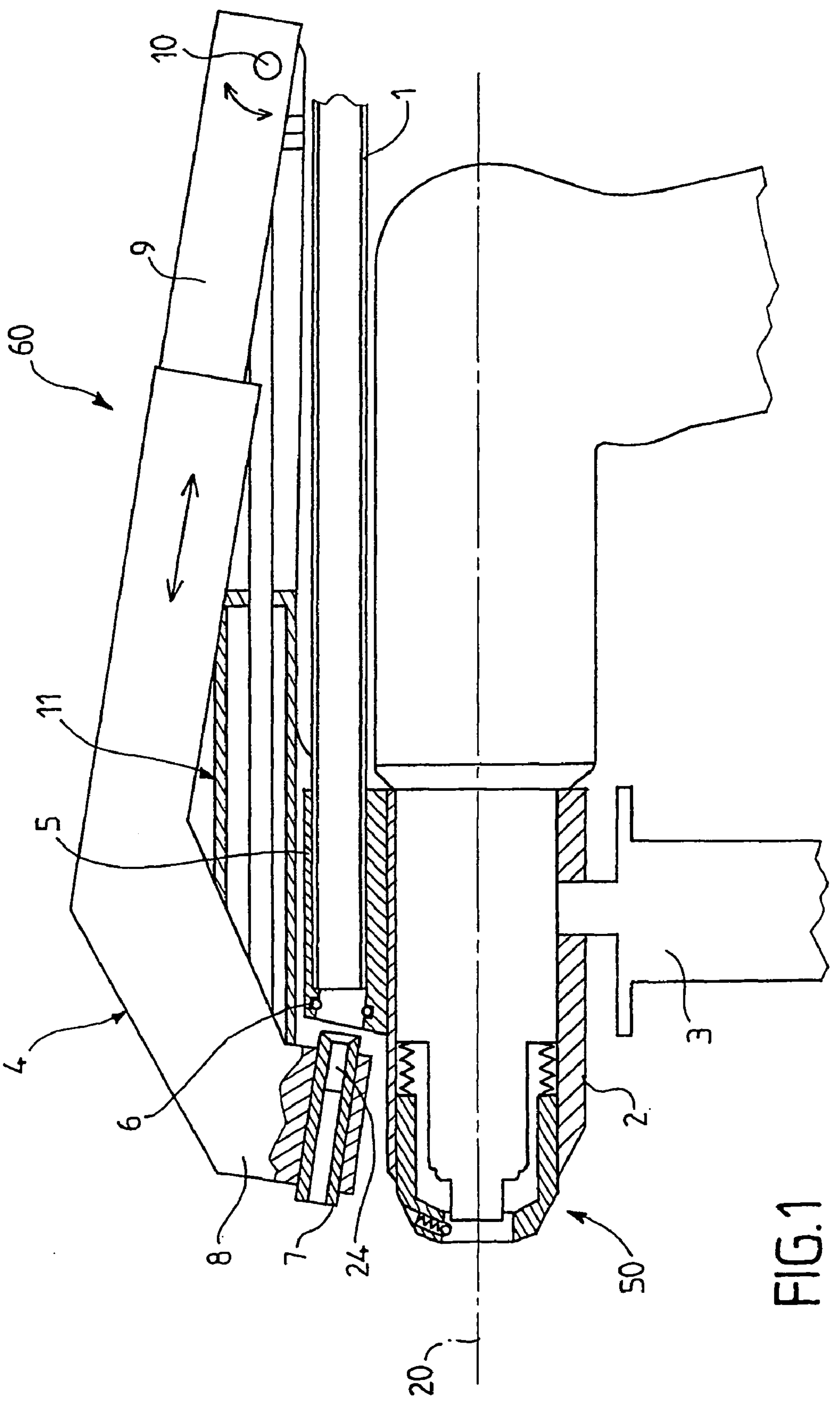
FIGS. 1 to 3 are diagrammatical sectional views of a first variation of a tool according to the invention, illustrating the operation of such tool, respectively in distribution and reception position of a fastening element at the loading means, in loading position of the fastening element at the holding means, then when positioning the fastening element at the parts to be assembled.

This invention relates to a portable tool for the installation of fastening parts or of metal sheets, or similar which in both variations shown, includes:

means 1, 5 for distributing fastening elements 24, one by one, according to a distributing axis, means 50 for holding a fastening element 24 according to a so-called setting axis, loading means 60 for transferring a fastening means 24 from the distribution means 1, 5 to the holding means 50, and means 23 for positioning a fastening element in a hole provided on the part.

Besides, according to the main feature of the invention, the loading means 60 perform alternately a so-called loading motion and a so-called return motion, back to initial position. The loading means enables to transfer a fastening element 24 from the distribution means 1, 5 to the holding means 50 of a fastening element 24 according to the setting axis 20. The return motion to initial position enables the loading means 60 to go back with respect to the distribution axis, substantially parallel and coplanar to the setting axis.

According to the invention, the loading means 60 follow the same path, in one direction and in the opposite direction, during the loading motion and during the return motion to initial position. This path is composed of several parts which will be detailed at a later stage.

Figure 5:
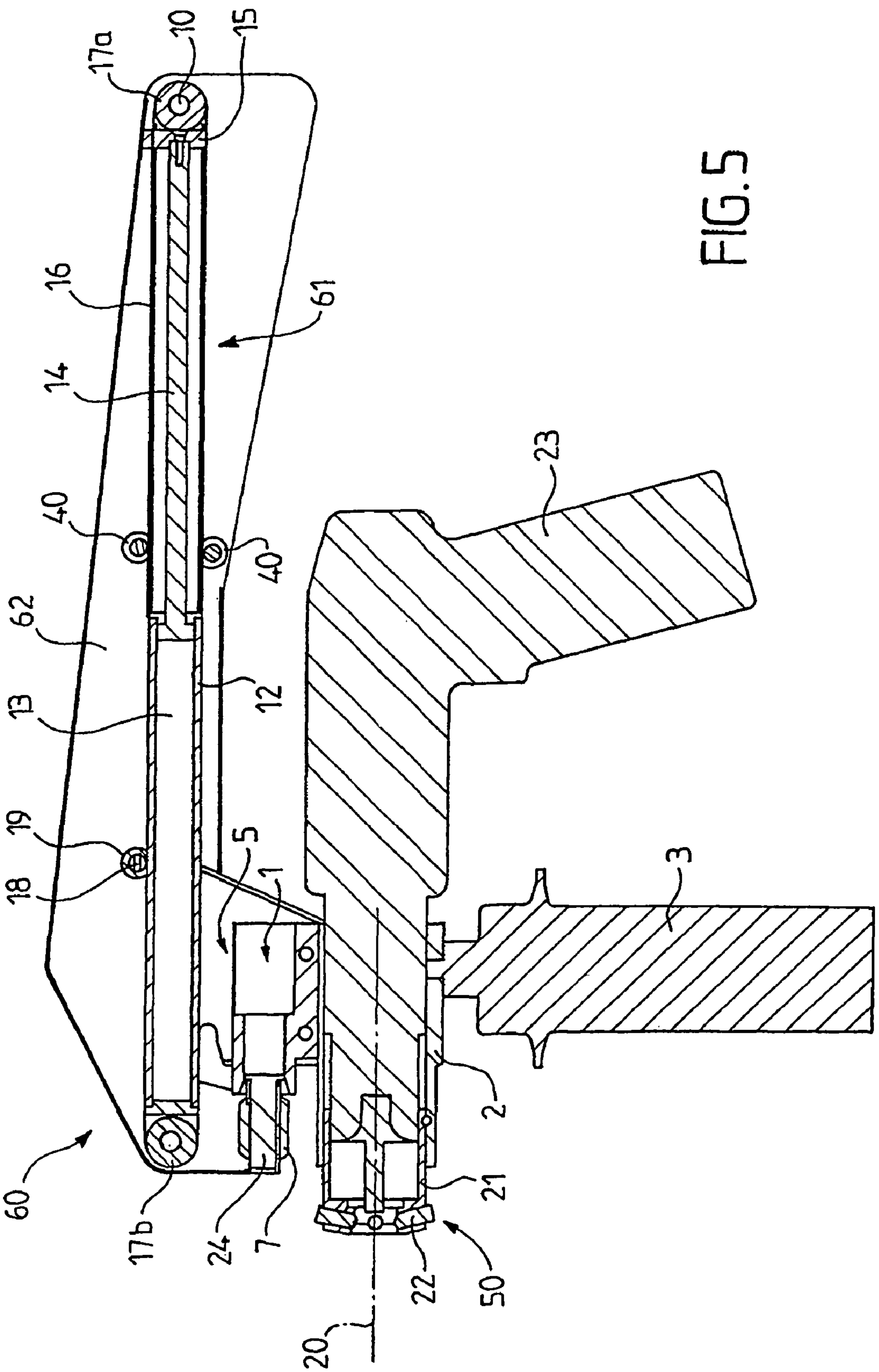
FIG. 5 is a sectional view of another variation of a tool according to the invention.
Figure 6:
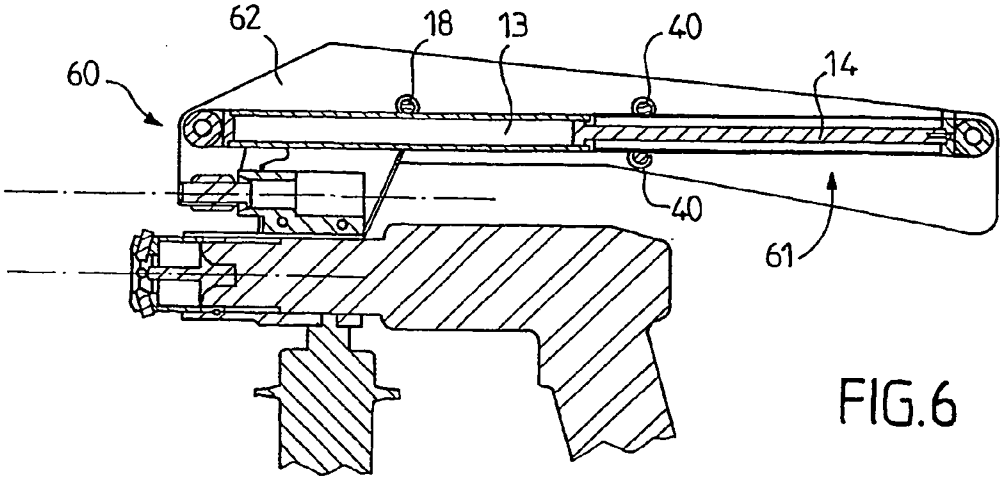
FIGS. 6 to 11 illustrate the successive stages of the operation cycle of the tool represented on FIG. 5.
Figure 7:
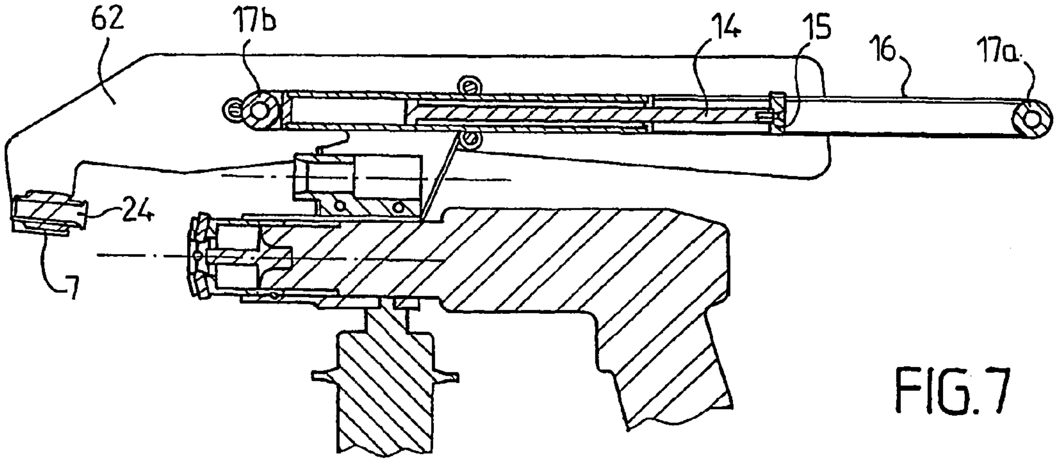
Figure 8:
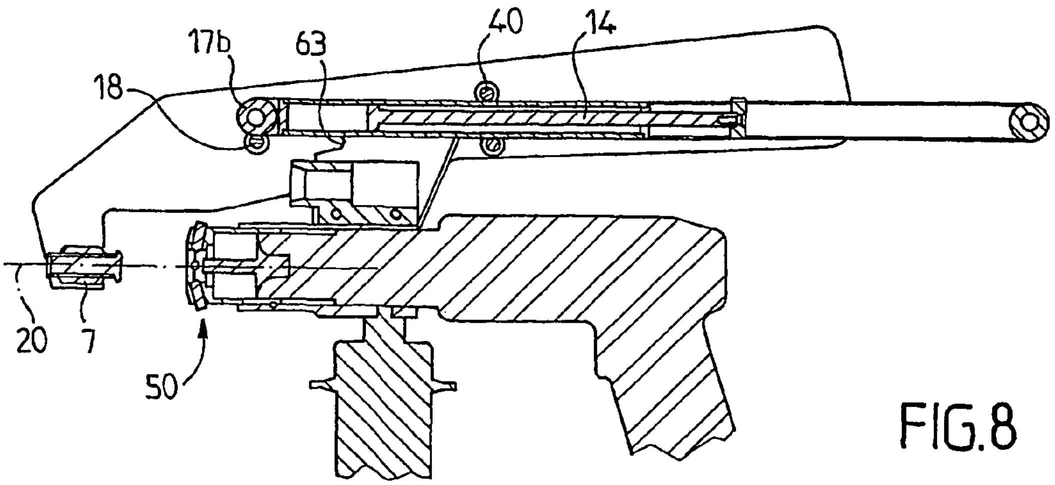
Figure 9:
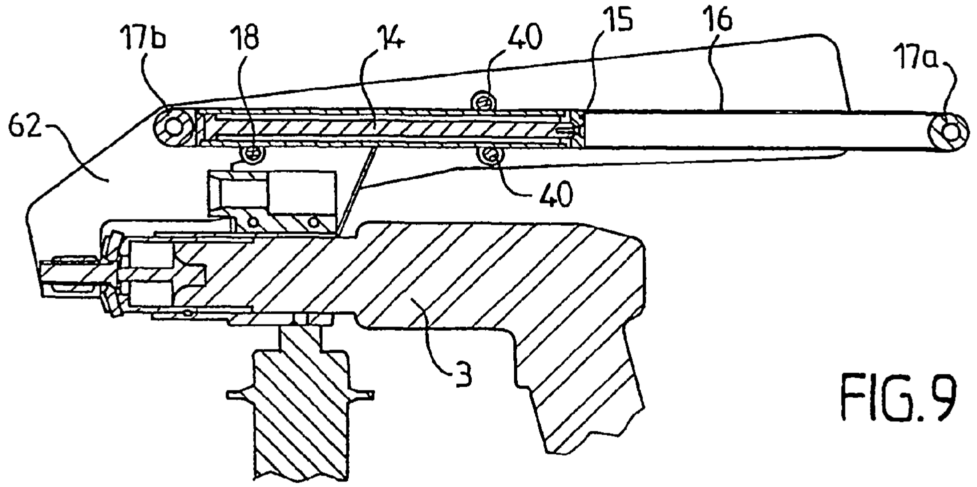
Figure 10:
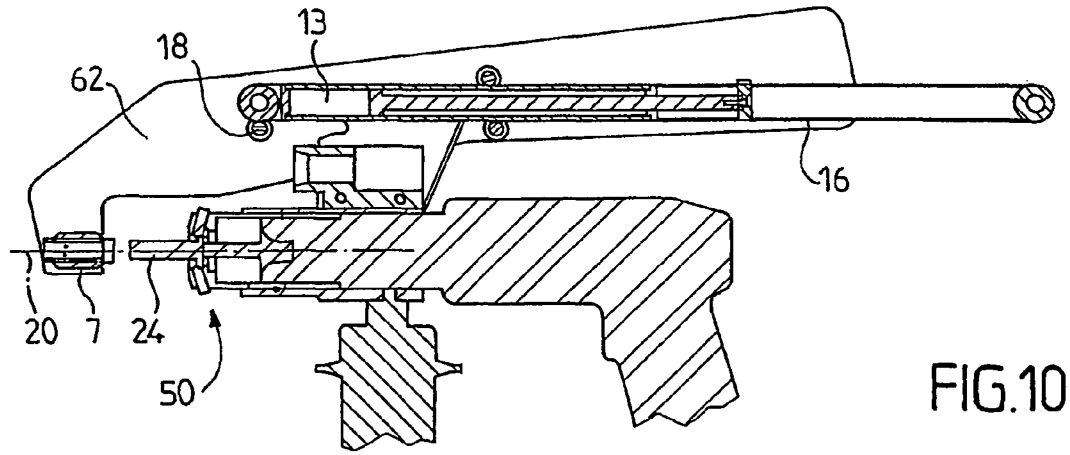
Figure 11:
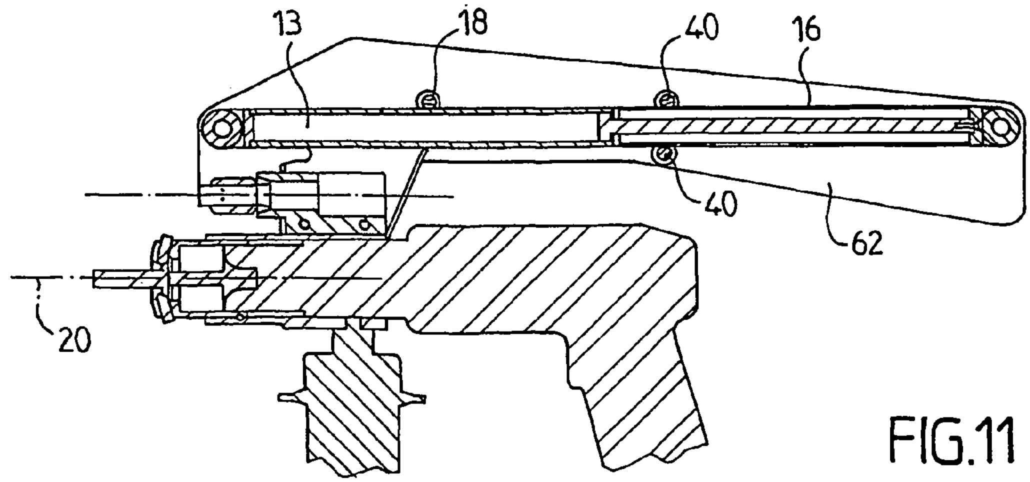

With reference to FIGS. 1 and 5, the loading means 60 may comprise advantageously at least one mobile arm 4 or 62, fitted with means 7 for receiving a fastening element 24.

The loading moans 60 also comprise means 61 for actuating said mobile arm. Said means 61 for actuating said mobile arm comprise at least one actuator 12–15 and means 16–19 for transmitting the motion of the actuator to the mobile arm, so that means for actuating the mobile arm 4 or 62 being in motion alternately in one direction then in the opposite direction, drive said mobile arm along the path mentioned above, alternately in one direction than in the opposite direction.

The reception means 7 may be in the form of a rivet-carrier capable of cooperating with a fastening element 24, such as a rivet.

Advantageously, said transmission means are in the form of a flexible element 16 stretched between two parallel rolls 17*a*, 17*b*. Then, said mobile arm 4 or 62 is slaved to said flexible element 16.

For example, the flexible element 16 may be a belt or a band.

As already underlined, the actuator is capable to drive the mobile arm 4 or 62 via the transmission means 16–19. It may a linear actuator or a rotary actuator.

A linear actuator may be in the form of a jack. In such a case, the piston 14 may go back and forth in the cylinder 13 according to whether, for instance, air is injected in one chamber or the other of the cylinder. At the end of the tail of the piston 14, a driving element 15 is fastened. This driving element 15 is also fastened to the flexible element 16. Thus, when the piston moves in the cylinder. It drives the flexible element 16 by means of the driving element 15, in the linear portion situated between both rolls 17*a* and 17*b*.

A rotary actuator could be for example a motor slaved at least to one of both rolls 17*a* or 17*b*.

Figure 2:
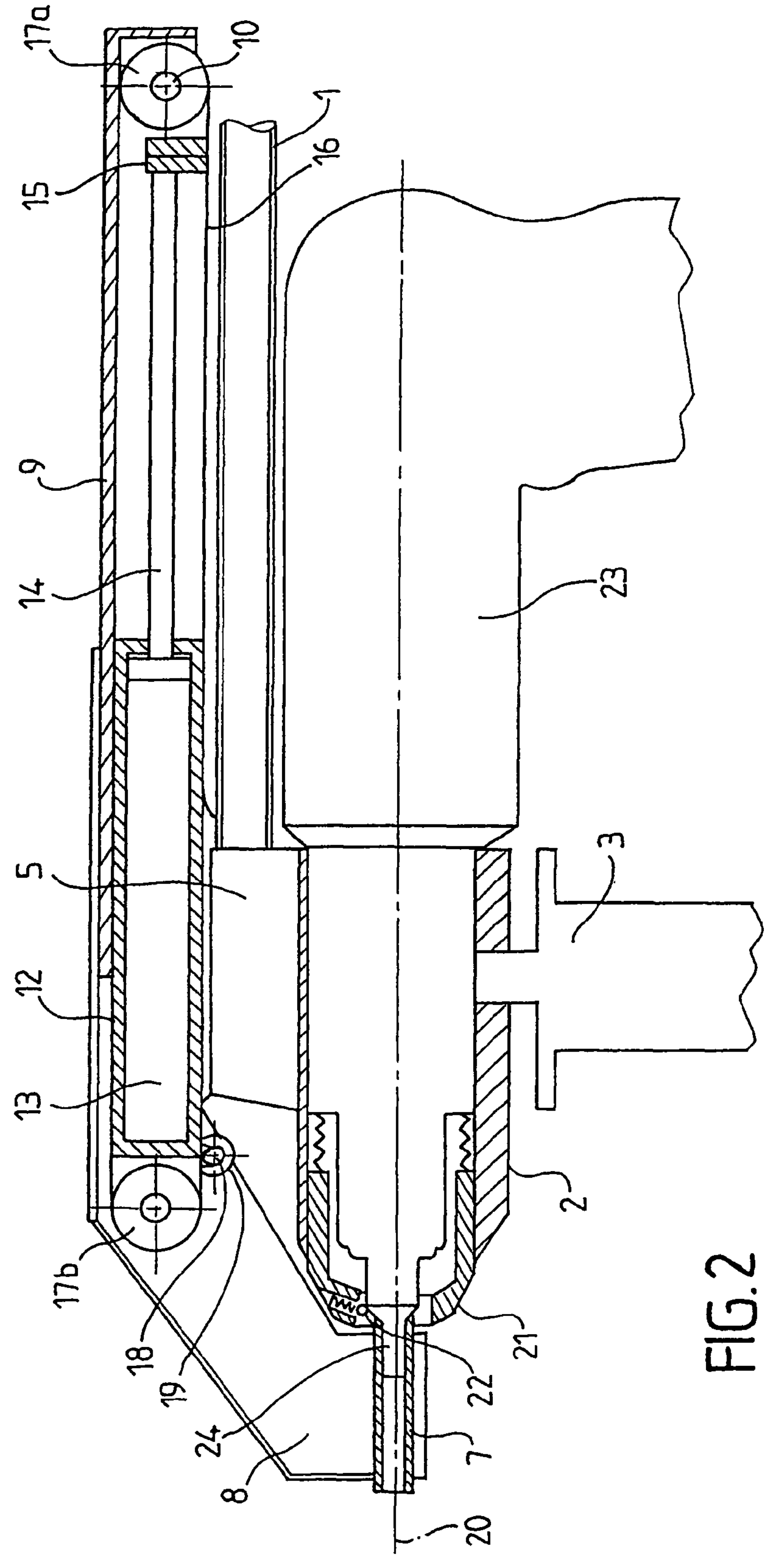
Figure 3:
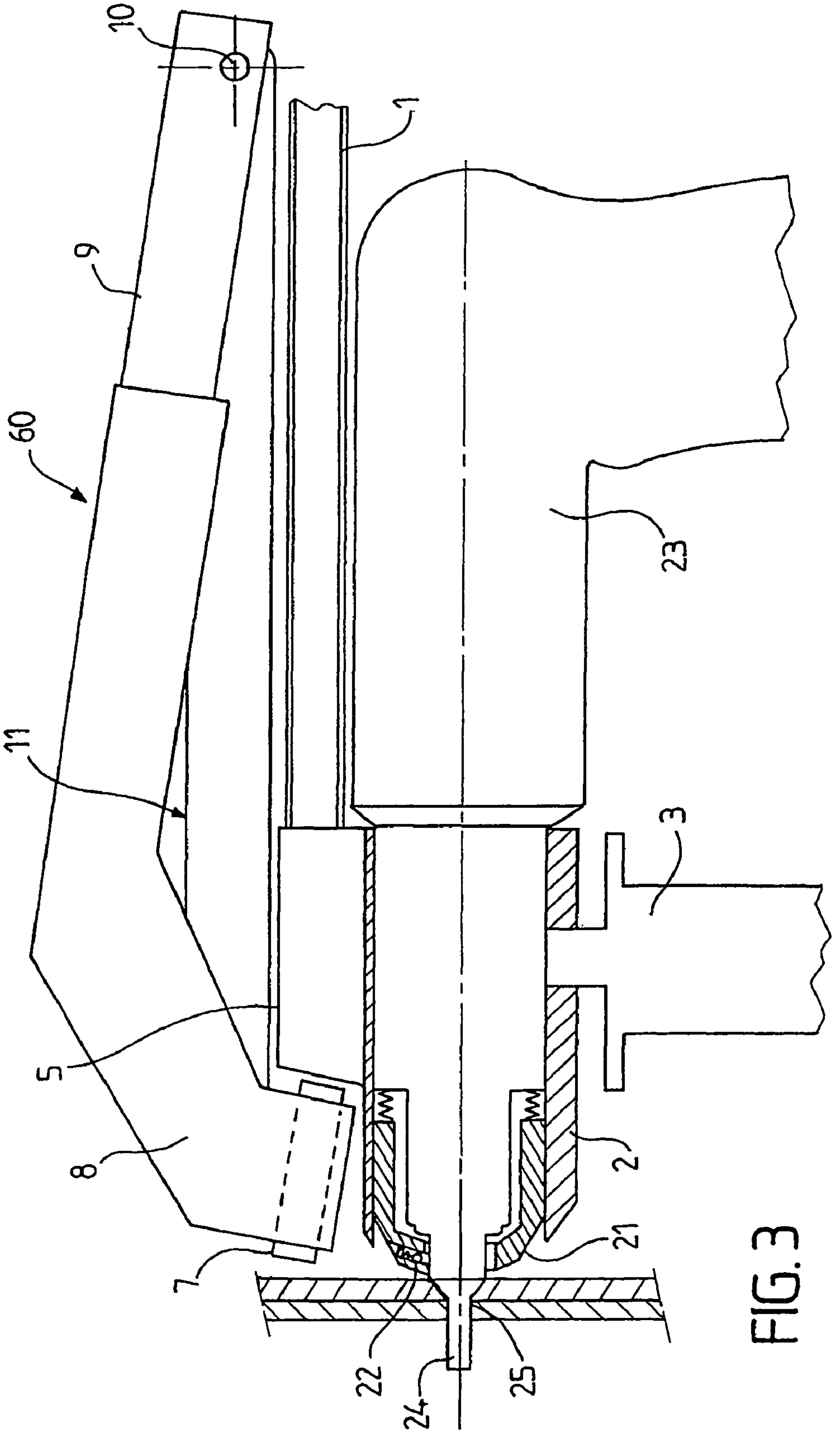

We shall now describe, with reference to FIGS. 1 to 3, a first variation of a tool according to the invention.

The whole loading device 60 is fastened to a chassis 2 whereon is mounted a handle 3 which enables an ergonomic grip of the tool according to invention.

Advantageously, the mobile arm is in the form of a telescopic pivoting arm 4. An item 9 of the arm is mounted to pivot around the roll 17*a*. Another item 8 of said arm serves as a support for the reception means 7 and it may move along the item 9 mounted to pivot. Moreover, said Item 8 is slaved to said transmission means via a linking pin 18.

For example, the linking pin 18 is fastened to the flexible element 16 by an eccentric catch 19.

Moreover, the portable tool is fitted with means 1 for distributing fastening elements. It may be for instance a distribution tube fitted at its end with means 5 for re-centering the fastening element. Advantageously, the re-centering means are fitted with a groove wherein is located a spring whereof the spires may be tilted with respect to its axis.

It is also advantageously to provide that the means 50 for holding a fastening element 24 are in the form of an elastic device 21 enabling to apply a bearing load over at least one portion of the zone of larger diameter of the fastening element, in order to maintain said element along a setting axis 20.

In particular, the elastic device comprises at least a spring 22 whereof the spires may be tilted with respect to its axis.

Still with reference to FIG. 1, the positioning means 23 may be in the form of a pushing or riveting, or still screwing device.

Obviously, the features regarding the holding means 50, the distribution means 1 as well as the positioning means 23 may be applied to other variations of a tool according to the invention.

FIG. 1 illustrates the initial state of an operation cycle of a tool according to the invention. A fastening element 24 is pushed into the distribution means 1, in this instance a distribution tube, by pneumatic pressure. It then runs through the re-centering means 5 and the rod of the fastening element is re-centered by the re-centering spring 6. This enables to align the fastening element with reception means, here the rivet carrier 7. The body of the fastening element then engages into the rivet carrier 7 which is situated at the end of the item 8 of the mobile arm.

At that stage, the tail of the piston 14 is almost entirely inside the cylinder 13. Only the end fastened to the driving element 15 remains outside the cylinder. A chamber of the cylinder is therefore at maximum volume while the other chamber is at minimum volume.

When the operator actuates the control of the loading means 60, pressurized air is injected into the chamber of the cylinder 13 whereof the volume is nil, which enables to push the piston 14 which, by means of the driving element 15, drives the flexible element 16 into translation.

Consecutively, the linking pin 18 is driven first of all into translation, then into rotation around the roll 17*b*.

During this motion, the item 8 of the mobile arm 4 moves along the rod 9 of said arm. As the item 8 is slaved to the flexible element 16 by means of the linking pin 18, and as said pin follows a rotation motion, the mobile arm 4 will also enter into rotation around the pin 10.

This enables to bring the rivet carrier 7 into the setting axis 20. As the motion of the piston 14 is not completed, the linking pin 18 has another translation motion, in the direction opposite that of its previous translation motion. The motion of the rivet carrier 7 becomes therefore rectilinear again, in the setting axis 20. The fastening element 24 is thus pushed into the holding means 50, at the elastic device 21. The head of the fastening element 24 may then cooperate with a holding spring 22. The result is then that illustrated on FIG. 2.

Pressurized air is then injected into the now empty chamber, which was initially full, which causes the rivet-carrier and the mobile arm to move along the same path in the opposite displacement direction. The fastening element 24 is held at the holding means 50 whereas the mobile arm returns to its initial position, the rivet-carrier 7 then facing the outlet of the distribution means 1.

It should be noted that during the return motion, the rivet carrier 7 moves in the setting axis, and thus longitudinally with respect to the rivet. This enables to prevent notably the fastening element from being twisted as the rivet carrier 6 and the mobile arm 4 are brought back to their initial position.

As illustrated on FIG. 3, the operator may then insert the fastening element 24 into the hole 25 provided in the part while moving the portable tool forward along the setting axis. When the holding means 50 come into contact with the part, the tool in motion drives the positioning means 23, for example a riveting hammer, which pushes the fastening element 24 and extracts said element from the holding means 50. Then the operator may actuate the riveting control.

Figure 4:
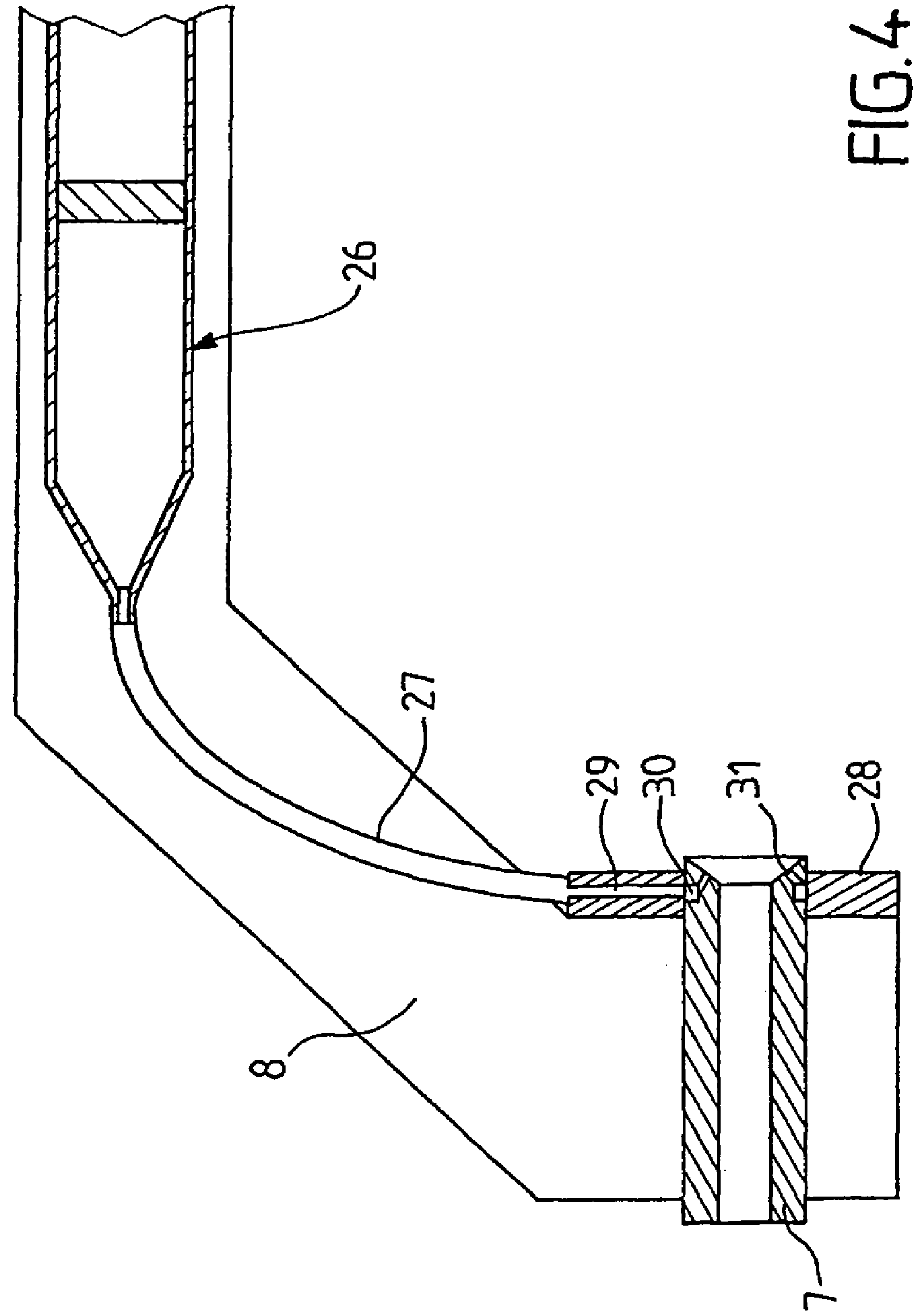
FIG. 4 is a diagrammatical sectional view showing means for setting a finishing product.

In an advantageous embodiment, as illustrated on FIG. 4, a tool according to the invention is fitted moreover with means 26–31 to apply a finishing product on the fastening element or around the hole.

For example, a syringe 26 containing the finishing product is fastened to the mobile arm 4 of the loading means 60. Said syringe 26 is linked to the rivet carrier 7 by means of a flexible pipe 27 connected to an infeed ring, The finishing product is extruded from the syringe through the pipe, goes through the hole 29 of the feeding ring 28, flows into the groove 30 of the rivet carrier 7 and comes out thereof through the orifices 31 at the surface resting on the fastening element.

The finishing product may be a sealing product, a glue or any other adequate product.

According to another variation of the invention, as illustrated on FIG. 5, the loading means 60 comprise a mobile arm which is in the form of a sliding arm 62 rather than a telescopic pivoting arm as described previously.

In such a case, said arm 62 is slaved to the flexible element 16 by means of a linking pin 18 fastened to this flexible element, by being snapped in the eccentric cam 19. This enables to drive the arm 62 along a path inscribed in a plane, running the rivet-carrier from a position situated in the extension of the distribution pipe 1 to a position situated in the working axis 20.

Indeed, the sliding arm 62 is fitted with guiding means 40 situated on either side of the volume delineated by the flexible element 16, and which slides freely above and below such flexible element 16.

The operation of a tool corresponding to such embodiment is illustrated on FIGS. 6 to 11. It is very similar to that described for the previous variation. Thus, when pressurized air is injected into the empty chamber of the cylinder 13 of the actuator, the flexible element 16 is driven thanks to the driving element 15. Consequently, the linking pin 18 is driven first of all into translation in a first direction, then into rotation around the roll 17*b*, then again into translation, in the opposite direction, until it reaches the stop 63 at the end of the stroke.

During the first part of the motion of the linking pin 18, guiding means 40 slide freely along the flexible element 16 and consequently the sliding arm 62 follows a translation motion. Then, when the linking pin 18 follows a rotational motion around the roll 17*b*, the guiding means 40 remain substantially immobile. Thus, the mobile arm follows a rotational motion corresponding to that of the linking pin 18.

Finally, when the linking pin 18 resumes a translation motion, the guiding means 40 do the same, in the opposite direction. The mobile arm 62 follows again a translation motion. Finally, the fastening element 24 is pushed by the holding means 50, similarly to that described previously.

It should be noted that throughout the loading motion from the distribution means 1 to the holding means 50, the piston 4 has performed only one motion, in a single direction.

Return to initial position is provided by injecting pressurized air into the chamber of the jack, initially full, now empty. This causes the mobile arm to follow the same path, but in the opposite direction.

As a summary, during the loading motion of the fastening element, from the distribution means 1 to the holding means 50, the path followed by the fastening element 24 consists essentially of three sections. In a first section, it follows a translation motion along the distribution axis. Then in a second part of this path, the fastening element follows substantially circular a path, which brings it from the distribution axis to the working axis 20. Finally, in a third part, the fastening element follows again a translation motion, according to the working axis 20, but in the direction opposite to the previous translation motion.

The whole motion is performed by displacement in a single direction of the actuator of the loading means 60.

In the embodiments described, the actuator is of linear type, a jack in this instance. It is quite thinkable to provide a rotary actuator which would drive one of both rolls 17*a* or 17*b*.

A particular design of a device according to the invention consists in using of its elements as a prop and in fastening a means thereto enabling to hold or to position it in space. It may be, for example, a suction device.

Advantageously, the tool may then be slaved to a digital control machine or an industrial robot enabling to position it in space.

It may also be interesting to integrate a tool according to the invention in a set of tools comprising moreover a drill, the tool according to the invention and the drill being able to move over half a revolution around an axis perpendicular to the setting axis 20, to position alternately the drill and said tool in the working axis.

Naturally, other embodiments, understandable to the man of the art, could have been contemplated without departing from the framework of the invention.

I claim:

1. A portable tool for installation of fastening elements comprising:

- a means for distributing the fastening elements one-by-one along a distribution axis;
- a means for holding one of the fastening elements along a setting axis;
- a loading means for transferring the fastening elements from said means for distributing to said means for holding; and
- a means for positioning the fastening elements in a hole, said loading means for alternately performing a loading motion in one direction to transfer the fastening elements from said means for distributing to said means for holding and a return motion in an opposite direction from said means for holding to said means for distributing.

2. The portable tool of claim 1, said loading means comprising at least one mobile arm, the mobile arm having a means for receiving the fastening element thereon and an actuator, said loading means having a means for transmitting a motion of said actuator to said mobile arm.

3. The portable tool of claim 2, said means for transmitting comprising:

- a pair of parallel rolls; and
- a flexible element stretched between said pair of parallel rolls, said mobile arm being slaved to said flexible element.

4. The portable tool of claim 3, said actuator being a linear actuator, said linear actuator slaved to said flexible element so as to drive said flexible element into a linear orientation between said pair of parallel rolls.

5. The portable tool of claim 3, said actuator being a rotary actuator drivably connected to said pair of parallel rolls.

6. The portable tool of claim 3, said mobile arm being a telescopic pivoting arm, one portion of said pivoting arm being pivotally mounted, another portion of said pivoting arm being slaved to said means for transmitting by a linking pin.

7. The portable tool of claim 3, said mobile arm being a sliding arm, said sliding arm being slaved to said means for transmitting by a linking pin.

8. The portable tool of claim 1, said means for distributing comprising a distribution pipe fitted with a means for centering the fastening element.

9. The portable tool of claim 1, said means for holding comprising an elastic device cooperative with a large diameter portion of the fastening element so as to maintain the fastening element on said setting axis.

10. The portable tool of claim 9, said means for holding comprising at least one spring having a longitudinal axis, the spring having a spires tilted with respect to said longitudinal axis.

11. The portable tool of claim 1, said loading means for applying a finishing product to the fastening element or around the hole.

12. The portable tool of claim 11, said loading means comprising a reservoir containing said finishing product toward an area of application.

* * * * *